Sept. 21, 1965 P. GARNER 3,207,035

GEAR SHAVING MACHINE

Filed Aug. 12, 1963

Inventor
PERCY GARNER
By Norris & Bateman
Attorneys 3,207,035
GEAR SHAVING MACHINE
Percy Garner, Manchester, England, assignor to
David Brown Industries Limited
Filed Aug. 12, 1963, Ser. No. 301,343
Claims priority, application Great Britain, Aug. 16, 1962,
31,393/62
10 Claims. (Cl. 90—1.6)

The invention relates to gear shaving machines, and has for its object to enable such machines to produce gears having teeth which are crowned or otherwise modified in shape longitudinally.

According to the invention, a gear shaving machine comprises a table element mounted for rocking movement about a fixed axis, a reciprocable slide element, and hydraulic means for rocking the table element in timed relation to the reciprocation of the slide element, one of said elements being adapted to carry a workpiece and the other of said elements being adapted to carry a shaving cutter. Preferably, the table element is adapted to carry the workpiece and the slide element is adapted to carry the shaving cutter. The hydraulic means preferably rock the table element through means of cam mechanism.

A preferred embodiment of the invention will now be described, by way of example only, with reference to the accompanying drawings, of which:

Figure 1:
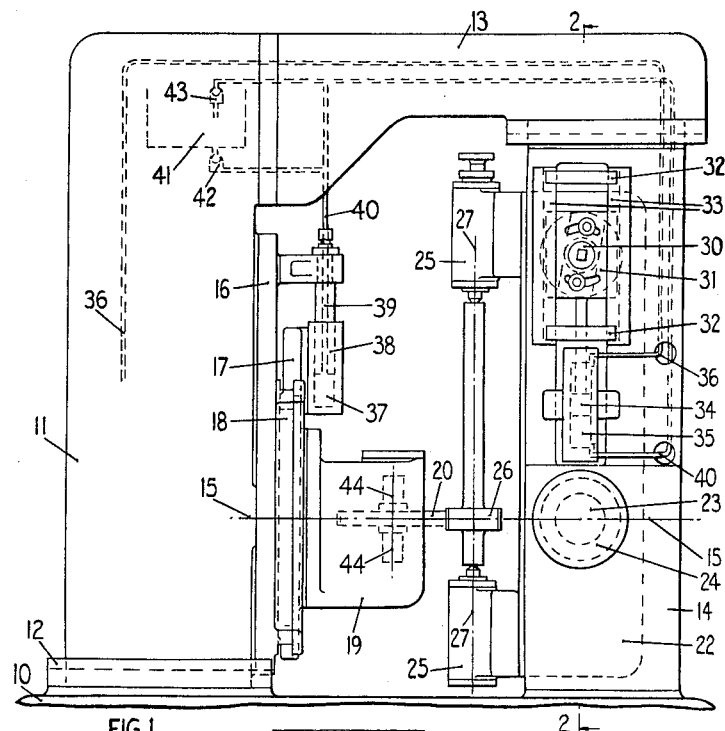
FIG. 1 is a side elevation of a gear shaving machine.
Figure 2:
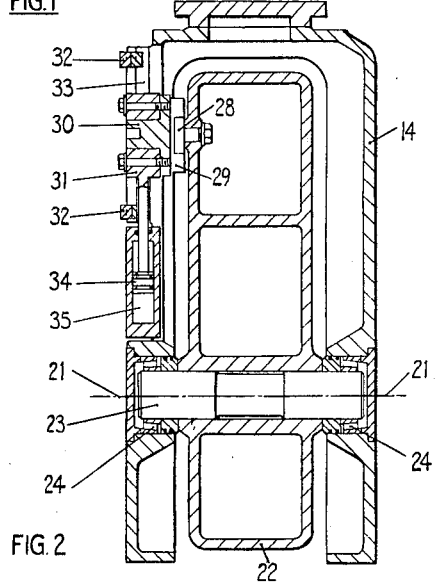
FIG. 2 is a sectional view on the line 2—2 in FIG. 1.

Referring now to the drawings, a gear shaving machine has a frame comprising a bed 10, a cutter head support member 11 slidable on horizontal rectilinear guides 12 formed on the top surface of the bed 10, an over-arm 13 secured to the upper end of the support member 11, and a vertical member 14 secured at its lower end to the top surface of the bed 10 and engaging slidably at its upper end with the over-arm 13. Mounted on the support member 11 for angular adjustment about an axis 15 is a cutter head comprising a back-plate 16 on which a cutter slide 17 is reciprocable in rectilinear guides 18. The cutter slide 17 carries in angularly adjustable relationship thereto a cutter housing 19 in which a shaving cutter 20 is rotatably mounted. A conventional hydraulic motor is provided within the cutter housing 19 for driving the shaving cutter 20, a conventional hydraulic jack is attached to the backplate 16 for reciprocating the cutter slide 17, and a pair of conventional hydraulic jacks is provided within the bed 10 for moving the support member 11 along the guides 12. Mounted on the vertical member 14 for angular movement about an axis 21 is a worktable 22 secured on a spindle 23 the ends of which are supported in bearings 24 carried by the vertical member 14. The worktable 22 is provided with centres 25 for mounting a workpiece comprising a toothed gear 26 for free rotation about an axis 27. At a point on the worktable 22 vertically above the axis 21 there is provided a cam follower comprising a roller 28 which engages a rectilinear cam track 29 formed in a member 30. The member 30 is carried by, and is angularly adjustable relative to, a slide block 31 which is reciprocable between adjustable stops 32 in vertical rectilinear guides 33 formed on the vertical member 14. The slide block 31 is connected to a piston 34 slidable in a hydraulic cylinder 35 which is secured to the vertical member 14. Oil under pressure supplied via a flexible conduit 36 urges the piston 34 into its retracted position. A hydraulic cylinder 37 having the same cross-sectional area as the hydraulic cylinder 35 is secured to the cutter slide 17 and is slidable on a piston 38 secured to the back-plate 16. The piston 38 is provided with an axial hole 39 the outer end of which is connected via a flexible conduit 40 to the hydraulic cylinder 35 secured to the vertical member 14. The flexible conduit 40 communicates with a sump 41 by way of a non-return valve 42 and a relief valve 43. The non-return valve 42 is arranged to permit oil to be drawn from the sump 41 into the conduit 40, and the relief valve 43 is arranged to permit oil to escape from the conduit 40 to the sump 41.

In operation, a workpiece comprising a toothed gear 26 is mounted between the centres 25 for free rotation about the axis 27, the back-plate 16 is angularly adjusted to determine the direction of reciprocation of the cutter slide 17, and a shaving cuter 20 is mounted in the cutter housing 19 which is angularly adjusted to enable the teeth of the cutter 20 to mesh correctly with the teeth of the gear 26. Normally, there is selected a cutter 20 having a helix angle different from the helix angle of the gear 26, and thus the axis 44 of the cutter 20, the direction of reciprocation of the cutter slide 17, and the axis 27 of the gear 26 are all inclined at different angles although disposed in parallel planes. The cutter head support member 11 is moved on the bed 10 towards the worktable 22 until the axis 27 of the toothed gear 26 and the axis 44 of the shaving cutter 20 are the required distance apart for shaving to commence. The shaving cutter 20 is then caused to rotate, thus driving the toothed gear 26, and simultaneously the cutter slide 17 is caused to reciprocate. As shaving of the tooth flanks of the toothed gear 26 progresses, the cutter head support member 11 is intermittently moved slightly closer to the worktable 22 until the axis 27 of the toothed gear 26 and the axis 44 of the shaving cutter 20 are the required distance apart for shaving to be completed. The cutter head support member 11 is then withdrawn away from the worktable 22, the finished workpiece is removed and the next workpiece to be shaved is mounted between the centres 25. As shaving of each workpiece is taking place, the reciprocations of the cutter slide 17 cause oil to be pumped back and forth between the hydraulic cylinder 37 and the hydraulic cylinder 35. This causes the piston 34 slidable in the hydraulic cylinder 35 to reciprocate, and as said piston is connected to the slide block 31 carrying the cam track 29 which engages the roller 28 carried by the worktable 22, said worktable is caused to rock about the axis 21 in timed relation to the reciprocations of the cutter slide 17. The angular displacement of the worktable 22 is variable down to zero by appropriate angular adjustment of the member 30 in which the cam track 29 is formed relative to the slide block 31.

The stops 32 are so adjusted that the stroke of the piston 34 is very slightly shorter than the stroke of the cutter slide 17. Thus a small amount of oil is drawn through the non-return valve 42 into the flexible conduit 40 at the end of each stroke made by the cutter slide 17 in a direction away from the piston 38, and provided that there is no leakage the same amount of oil is expelled from the flexible conduit 40 through the relief valve 43 at the end of the return stroke of the cutter slide 17. If, however, there is any leakage, the amount of oil expelled will be less than the amount previously drawn in, to make up the loss due to leakage and thus to maintain the reciprocations of the slide block 31, and consequently the rocking of the worktable 22, in phase with the reciprocations of the cutter slide 17.

What I claim is:

1. A gear shaving machine comprising a support, a table adapted to rotatably mount a gear to be shaved, means rockably mounting said table on the support, a cutter slide slidably mounted on said support, a power driven rotatable shaving cutter mounted on said cutter slide in operative association with said gear, means for reciprocating said cutter slide, and means for rocking said table in timed relation to reciprocation of said slide comprising a hydraulic system operatively connected between said table and said slide and energized by movement of said slide, said hydraulic system comprising a pair of hydraulic cylinders having substantially direct motion transmitting connections to said cutter slide and said table respectively and conduit means connected directly between the cylinders and through which hydraulic fluid is pumped in opposite directions during reciprocation of said cutter slide.

2. A gear shaving machine comprising a support, a table adapted to rotatably mount a gear to be shaved, means rockably mounting said table on the support, a cutter slide slidably mounted on said support, a power driven rotatable shaving cutter mounted on said cutter slide in operative association with said gear, means for reciprocating said cutter slide, and means for rocking said table in timed relation to reciprocation of said slide comprising a hydraulic system operatively connected between said table and said slide and energized by movement of said slide, said hydraulic system comprising fluid pressure generating means connected to be operated by said cutter slide, a reversible fluid pressure responsive device operably connected to said table and a hydraulic circuit connecting said fluid pressure generating means with said device, whereby opposite movements of said cutter slide correspondingly oppositely rock said table.

3. In the gear shaving machine defined in claim 2, said fluid pressure generating means comprising relatively reciprocable piston and cylinder means at said cutter slide, and said device comprising a cylinder containing a slidable piston operably connected by motion transmitting mechanism to said table, with said hydraulic circuit connected into said cylinder at opposite sides of said piston.

4. In the gear shaving machine defined in claim 3, said mechanism comprising cooperating cam and follower means mounted on said piston and said table respectively.

5. A gear shaving machine having a frame and comprising a table element mounted on the frame for rocking movement about a fixed axis, a reciprocable slide element on the frame, one of said elements being adapted to carry a workpiece and the other of said elements being adapted to carry a shaving cutter, a cam mechanism drivably connected to the table element, a first hydraulic unit one component of which is secured to the reciprocable slide element, a second hydraulic unit hydraulically connected to be actuated by said first hydraulic unit, and means drivably connecting one component of said second hydraulic unit to said cam mechanism, whereby said table element is rocked in synchronism with reciprocation of said slide element.

6. A gear shaving machine according to claim 5, wherein the table element is adapted to carry the workpiece and the slide element is adapted to carry the shaving cutter.

7. A gear shaving machine according to claim 6, wherein the cam mechanism comprises a cam surface reciprocable by said second hydraulic unit and a coacting cam follower is mounted on the table element.

8. A gear shaving machine according to claim 5, wherein said first hydraulic unit comprises a cylinder on the reciprocable slide element and piston fixed on the machine frame, and the second hydraulic unit comprises a cylinder fixed on the machine frame, and a piston coupled to said cam mechanism.

9. A gear shaving machine having a frame and comprising a table element mounted on the frame for rocking movement about a fixed axis, a reciprocable slide element carried by the frame, one of said elements being adapted to carry a workpiece and the other of said elements being adapted to carry a shaving cutter, a cam mechanism drivably connected to said table element, a first hydraulic unit comprising a cylinder on said reciprocable slide element and a piston on the machine frame, a second hydraulic unit comprising a cylinder on the machine frame and a reciprocable piston coupled to the cam mechanism, a hydraulic circuit between the first and second hydraulic units, control valve means in said hydraulic circuit, and stops rigid with the frame limiting the stroke of said piston coupled to the cam mechanism.

10. A gear shaving machine having a frame and comprising a table element mounted on the frame for rocking movement about a fixed axis, a reciprocable slide element carried by the frame, one of said elements being adapted to carry a workpiece and the other of said elements being adapted to carry a shaving cutter, a cam mechanism drivably connected to said table element, a first hydraulic unit comprising a cylinder on the reciprocable slide member and a piston on the machine frame, a second hydraulic unit comprising a cylinder on the machine frame and a reciprocable piston coupled to the cam mechanism, a hydraulic circuit comprising a sump, a conduit connected between the first and second hydraulic unit cylinders a sump and a non-return valve and a relief valve disposed between said connecting conduit and said sump, and stops rigid with the frame limiting the stroke of said piston coupled to the cam mechanism.

References Cited by the Examiner

UNITED STATES PATENTS

| | | | |
|---|---|---|---|
| 2,362,764 | 11/44 | Miller | 90—1.6 |
| 2,394,757 | 2/46 | Drummond | 90—1.6 |
| 2,542,569 | 2/51 | Praeg | 90—1.6 |

WILLIAM W. DYER, Jr., *Primary Examiner.*